US012578046B2

(12) United States Patent
Harmon et al.

(10) Patent No.: US 12,578,046 B2
(45) Date of Patent: Mar. 17, 2026

(54) AIR CONVEYANCE QUICK CONNECT FITTING

(71) Applicant: DEERE & COMPANY, Moline, IL (US)

(72) Inventors: Andrew W. Harmon, Geneseo, IL (US); Derryn W. Pikesh, Geneseo, IL (US)

(73) Assignee: Deere & Company, Moline, IL (US)

( * ) Notice: Subject to any disclaimer, the term of this patent is extended or adjusted under 35 U.S.C. 154(b) by 10 days.

(21) Appl. No.: 18/093,117

(22) Filed: Jan. 4, 2023

(65) Prior Publication Data

US 2024/0218949 A1 Jul. 4, 2024

(51) Int. Cl.
F16L 27/12 (2006.01)

(52) U.S. Cl.
CPC .................................. F16L 27/1273 (2019.08)

(58) Field of Classification Search
CPC ... F16L 27/127; F16L 27/1273; F16L 37/138; F16L 37/505
USPC ...................................................... 285/7, 302
See application file for complete search history.

(56) References Cited

U.S. PATENT DOCUMENTS

| | | | | |
|---|---|---|---|---|
| 2,793,055 A | * | 5/1957 | Meyerhoefer | .......... A47L 9/242 285/7 |
| 4,542,922 A | * | 9/1985 | Grossauer | .......... F16L 25/0045 285/320 |
| 4,625,998 A | * | 12/1986 | Draudt | ................ F16L 25/0036 285/7 |
| 4,836,580 A | * | 6/1989 | Farrell | ................ F16L 25/0045 285/133.11 |
| 5,042,844 A | * | 8/1991 | Iida | ..................... F16L 25/0036 285/7 |
| 6,209,925 B1 | * | 4/2001 | Edin | ....................... A47L 9/327 285/7 |
| 6,612,533 B2 | | 9/2003 | Biles et al. | |
| 6,791,031 B1 | * | 9/2004 | Manning | ................ H02G 3/065 174/659 |

(Continued)

FOREIGN PATENT DOCUMENTS

| | | |
|---|---|---|
| CN | 107504297 A | 12/2017 |
| DE | 102008013157 A1 | 9/2009 |

(Continued)

OTHER PUBLICATIONS

Extended European Search Report and Written Opinion issued in European Patent Application No. 23215561.4, dated Mar. 27, 2024, in 09 pages.

*Primary Examiner* — Zachary T Dragicevich
(74) *Attorney, Agent, or Firm* — Taft Stettinius & Hollister LLP; Stephen F. Rost

(57) ABSTRACT

A sliding connector pipe assembly having a pipe defining an axis and configured to direct fluid flow, a sliding connector slidably positioned around an end portion of the pipe, the sliding connector being selectively slidable between an extended displacement and a retracted displacement relative to the pipe, and a locking mechanism that selectively prevents axial movement of the sliding connector from the extended displacement to the retracted displacement. The locking mechanism prevents the sliding member from transition from the extended displacement to the retracted displacement regardless of the rotational orientation of the sliding connector relative to the pipe about the axis.

13 Claims, 15 Drawing Sheets

(56) References Cited

U.S. PATENT DOCUMENTS

| | | | |
|---|---|---|---|
| 9,604,320 B1 | 3/2017 | Fuentes | |
| 9,913,423 B2 * | 3/2018 | Henry ..................... | F16L 21/03 |
| 2002/0063427 A1 * | 5/2002 | Schiemann ............. | A47L 9/244 |
| | | | 285/7 |
| 2020/0124073 A1 | 4/2020 | Tsai | |

FOREIGN PATENT DOCUMENTS

| | | | | | |
|---|---|---|---|---|---|
| EP | 1104865 | A1 | 6/2001 | | |
| EP | 1375993 | A1 | 1/2004 | | |
| WO | WO-9935409 | A1 * | 7/1999 | ............. | A47L 9/244 |
| WO | 14042294 | A1 | 3/2014 | | |

* cited by examiner

AIR CONVEYANCE QUICK CONNECT FITTING

FIELD OF THE DISCLOSURE

The present disclosure relates to an air conveyance fitting, and more particularly to an air conveyance fitting that can quickly be disconnected.

BACKGROUND OF THE DISCLOSURE

Air seeders are commonly towed by an agricultural tractor, to apply a material such as seed, fertilizer and/or herbicide to a field. An air seeder includes a wheeled air cart which includes one or more frame-mounted tanks for holding material. In the case of multiple tanks, the tanks can be separate tanks, or a single tank with internal compartments. The air cart is typically towed in combination with a tilling implement, such as an air drill, one behind the other, to place the seed and fertilizer under the surface of the soil. Air seeders include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. The tanks of the air seeders are formed with bottom surfaces that slope downward for the granular material to move toward the metering system. Gravity, in combination with the vibrations and movement of the air seeder, act to move the granular material from the perimeter of the tank toward the metering system located at the center of the tank. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

For initial hookup of the air seeder, the traction unit is typically backed up to and coupled with the tilling implement, which in turn is backed up to and coupled with the air cart (e.g., by using respective hitch pins or the like, and assuming that the air cart is behind rather than in front of the air drill). All necessary hydraulic lines, air lines, electrical power lines and/or electrical data lines are then connected between the traction unit, tilling implement and air cart.

Regarding air lines, it will be appreciated that it is desirable to provide connections which are quick and easy to connect, while at the same time provide an effective fluid seal. With air seeders becoming ever larger, the number of air lines and thus the number of air line connections between the tilling implement and the air cart correspondingly increases, making the need for quick and easy air line connections even more important. One type of connection for an air line is a hose clamp however hose clamps have several downsides. One downside is that the hose clamps require labor to individually handle and assemble them. Moreover occasionally the air line becomes plugged with seed material and the hose clamp must be removed to enable access to the air line and the plug. Another downside is that during use of the air line, hose clamps are subject to a severe environment leading to corrosion, stress corrosion, cracking, and binding of the lead screw due to high friction under which the hose clamps are employed. Hose clamps also require a special tool to remove the hose clamp from the air line. In some applications the hose lines in which the hose clamps are clamping are prone to air leakage which leads to inefficiency and possible loss of granular product. Other connections include O-rings to seal the hose lines but these applications are often difficult to install.

SUMMARY

One embodiment is a sliding connector pipe assembly. The assembly has a pipe defining an axis and configured to direct fluid flow, a sliding connector slidably positioned around an end portion of the pipe, the sliding connector being selectively slidable between an extended displacement and a retracted displacement relative to the pipe, and a locking mechanism that selectively prevents axial movement of the sliding connector from the extended displacement to the retracted displacement. The locking mechanism prevents the sliding member from transition from the extended displacement to the retracted displacement regardless of the rotational orientation of the sliding connector relative to the pipe about the axis.

In one example of this embodiment, the locking mechanism is selectively releasable to allow the sliding connector to transition from the extended displacement to the retracted displacement. In part of this example, the locking mechanism is selectively releasable without the use of additional tools.

In another example of this embodiment, the sliding connector has a coupling end sized to overlap a receiver to fluidly couple the pipe to the receiver when the sliding connector is in the extended displacement. In part of this example the sliding connector has a sliding distance between the retracted displacement and the extended displacement, wherein the sliding distance is sufficient to allow the coupling end to at least partially overlap the receiver when in the extended displacement and the locking mechanism selectively locks the sliding connector in the extended displacement partially overlapping the receiver.

In yet another example of this embodiment, the locking mechanism comprises a latch that extends at least partially radially inwardly past an inner connector wall in a latched orientation. In part of this example, the latch is positioned at least partially radially inwardly past the inner connector wall in a neutral state. In another part of this example, the latch is deflectable to a released orientation wherein the latch does not substantially extend radially inwardly past the inner connector wall. In another part of this example, the locking mechanism is formed of the same material as a body of the sliding connector.

In yet another part of this example, the latch is formed, in part, of a cutout of the sliding connector. The cutout has a deflectable seal therein to prevent fluid from passing through the U-shaped cutout. Further, the latch ha a stiffening support to alter a push force required to deflect the latch to the released orientation.

In yet another example of this embodiment, the locking mechanism has a wicket slidable through corresponding through holes of the sliding connector between a locked orientation and a released orientation, wherein in the locked orientation at least a portion of the wicket extends radially inward from an inner connector wall to prevent the pipe from sliding thereby and in the released orientation the wicket does not extend past the inner connector wall and the pipe can slide thereby. In part of this example, in the locked orientation the wicket extends radially inward from the inner connector wall at two separate locations.

Another embodiment of this disclosure is a sliding connector assembly. The sliding connector has a pipe receiving end defined about an axis and configured to slidably receive a pipe therein, a coupling end configured to selectively couple the coupling end to a receiver, and a locking mechanism that selectively extends radially inward from an inner connector wall and is configured to selectively limit the axial movement of the pipe when positioned in the pipe receiving end. The locking mechanism is configured to selectively lock the axial location the pipe regardless of the rotation orientation of the pipe about the axis relative to the pipe receiving end.

In one example of this embodiment, the locking mechanism has a latch that extends at least partially radially inwardly past the inner connector wall in a latched orientation. The latch is deflectable to a released orientation wherein the latch does not substantially extend radially inwardly past the inner connector wall.

In another example of this embodiment the locking mechanism has a wicket slidable through corresponding through holes of the sliding connector between a locked orientation and a released orientation, wherein in the locked orientation at least a portion of the wicket extends radially inward from the inner connector wall to prevent the pipe from sliding thereby and in the released orientation the wicket does not extend past the inner connector wall and the pipe can slide thereby.

Yet another embodiment of this disclosure is a method for coupling a pipe to a receiver. The method includes releasing a locking mechanism on a sliding connector and axially moving the sliding connector to a retracted displacement on the pipe, positioning a coupling end of the sliding connector adjacent to a receiver, axially moving the sliding connector along the pipe towards an extended displacement as the coupling end is coupled to the receiver, and locking the sliding connector in the extended displacement with the locking mechanism such that the sliding connector is prevented from returning to the retracted displacement by the locking mechanism. The locking mechanism selectively locks the sliding connector in the extended displacement regardless of the rotational position of the sliding connector relative to the pipe or receiver about an axis.

One example of this embodiment includes removing the pipe from the receiver by releasing the locking mechanism by deflecting a latch on the sliding connector to allow the sliding connector to transition from the extended displacement to the retracted displacement.

Yet another example of this embodiment includes removing the pipe from the receiver by releasing the locking mechanism by transitioning a wicket to a released orientation on the sliding connector to allow the sliding connector to transition from the extended displacement to the retracted displacement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3b is a top view of the sliding connector of FIG. 3a;

FIG. 7b is a lowered bottom perspective view of the sliding connector of FIG. 7a;

FIG. 11a is a schematic representation of two manifolds with no tube positioned there between;

Corresponding reference numerals indicate corresponding parts throughout the several views.

DETAILED DESCRIPTION

The embodiments of the present disclosure described below are not exhaustive and do not limit the disclosure to the precise forms in the following detailed description. Rather, the embodiments are chosen and described so that others skilled in the art may appreciate and understand the principles and practices of the present disclosure.

Figure 1:
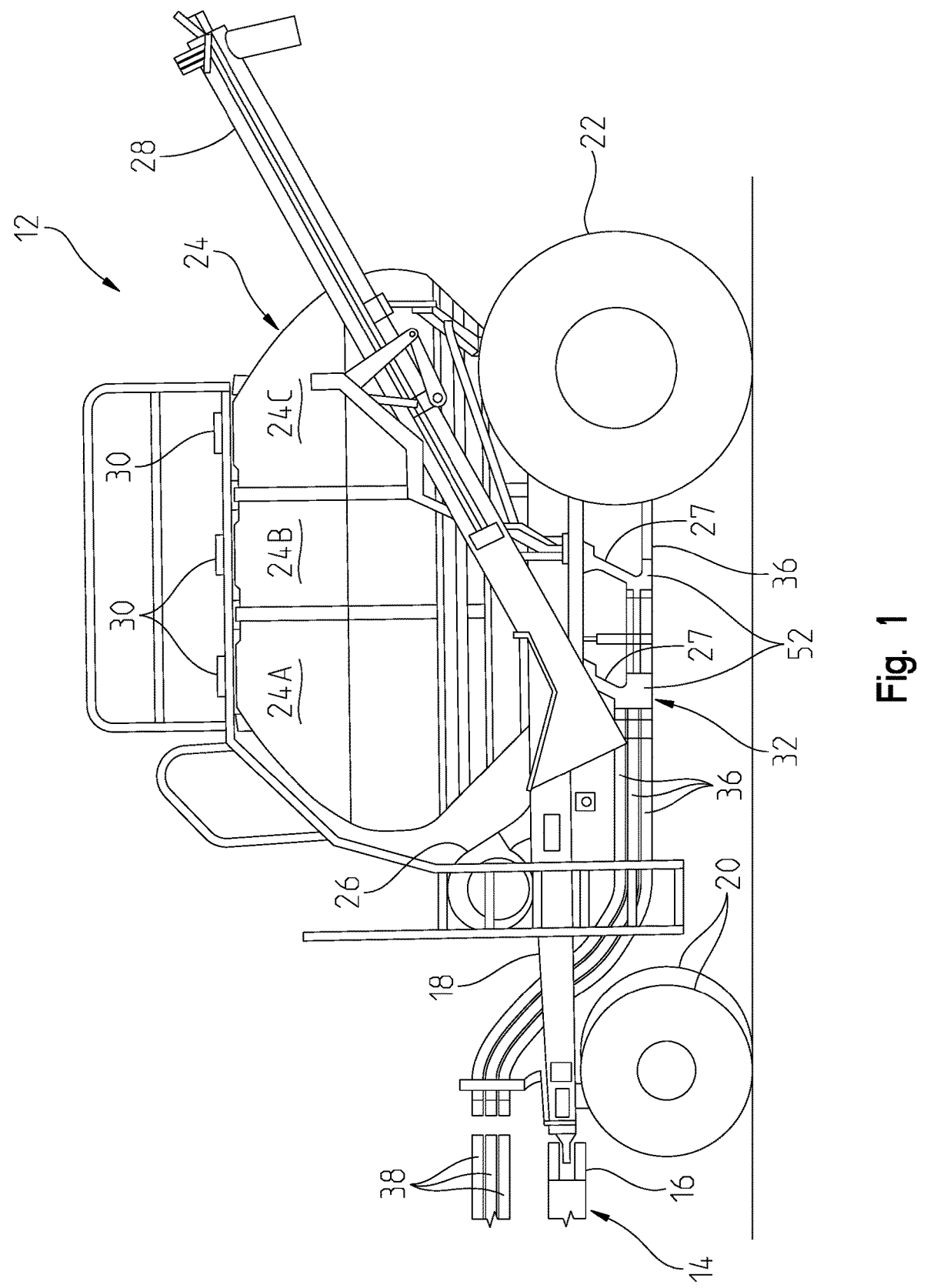
FIG. 1 is a side view of an air cart.
Figure 2:
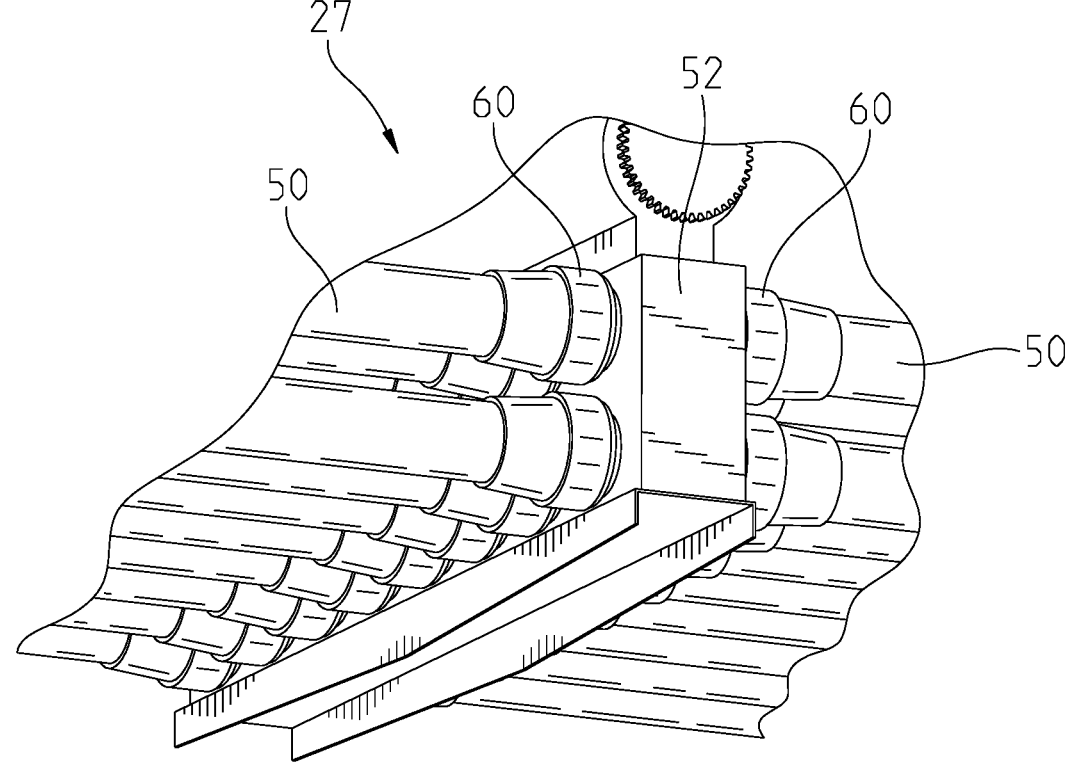
FIG. 2 is a lowered perspective view of components of a metering system of the air cart of FIG. 1.

FIGS. 1-2 illustrate a conventional air seeder assembly. FIG. 1 is a partial, side schematic view of an agricultural vehicle, and more particularly an air cart 12. Air cart 12 is towed by a tilling implement 14 with a portion of a rear hitch 16 illustrated in FIG. 1. The tilling implement 14 is an air drill but can be configured differently in other embodiments. In one embodiment, the tilling implement 14 includes a planter and the air cart 12 can be used to refill mini-hoppers on the planter. Air cart 12 can also include a rear hitch allowing air cart 12 to be towed in front of, rather than behind, tilling implement 14.

Air cart 12 includes a frame 18 which in turn includes front wheels 20, rear wheels 22, tank 24, blower 26, and auger 28. In the illustrated form, the tank 24 includes three separate mini-tanks or compartments 24A, 24B, and 24C with each mini-tank or compartment containing a material that is to be deposited or placed into the soil. Some materials include seed, fertilizer, insecticide, and herbicide among others. Each mini-tank or compartment 24A, 24B, and 24C has a top lid 30 that can be opened to fill the mini-tanks 24A, 24B, and 24C with material and then closed.

Air cart 12 includes a pneumatic distribution system 32 for delivering the air-entrained materials to the soil where trenches or rows have been formed by the tilling implement 14. Pneumatic distribution system 32 includes a metering system 27, blower 26 and a plurality of air lines 36. The metering system 27 dispenses material from the tanks 24A, 24B, and 24C into a manifold 52 and then the manifold 52 directs the product into one of multiple conveyance tubes 50 and from there the product is conveyed to an air seeder via a plurality of air lines 36. Although the illustrated embodiment includes three air lines 36, it is contemplated that a corresponding amount of air lines 36 as conveyance tubes 50 would be implemented. The conveyance tubes 50 extend to and terminate at a fluid line connection 60 for coupling with the manifold 52.

In one aspect of this disclosure, air lines 36 may be primary air lines that selectively direct fluid from the tank 24 to the remaining portions of the pneumatic distribution system 38. The primary air lines 36 may typically be installed after the tank 24, metering system 27, and manifold 52 are installed on the air cart 12. As such, the primary air lines 36 must be able to be removeably coupled between two substantially fixed locations. Further, often a user needs to remove the primary air line 36 to service the air cart 12 or fix a clog or other issue with the primary air line 36.

Figure 3A:
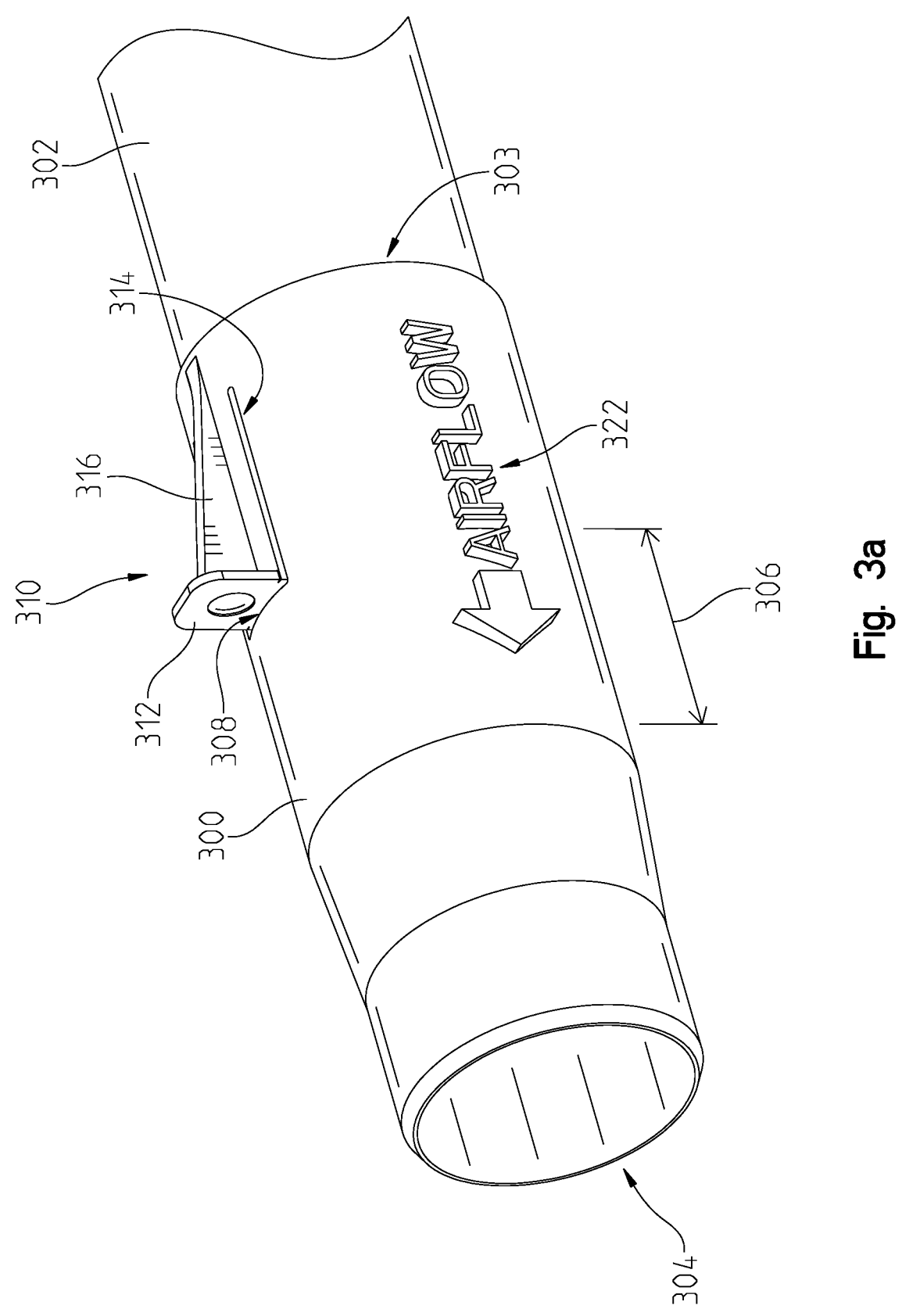
FIG. 3a is an elevated perspective view of one embodiment of a sliding connector.
Figure 3B:
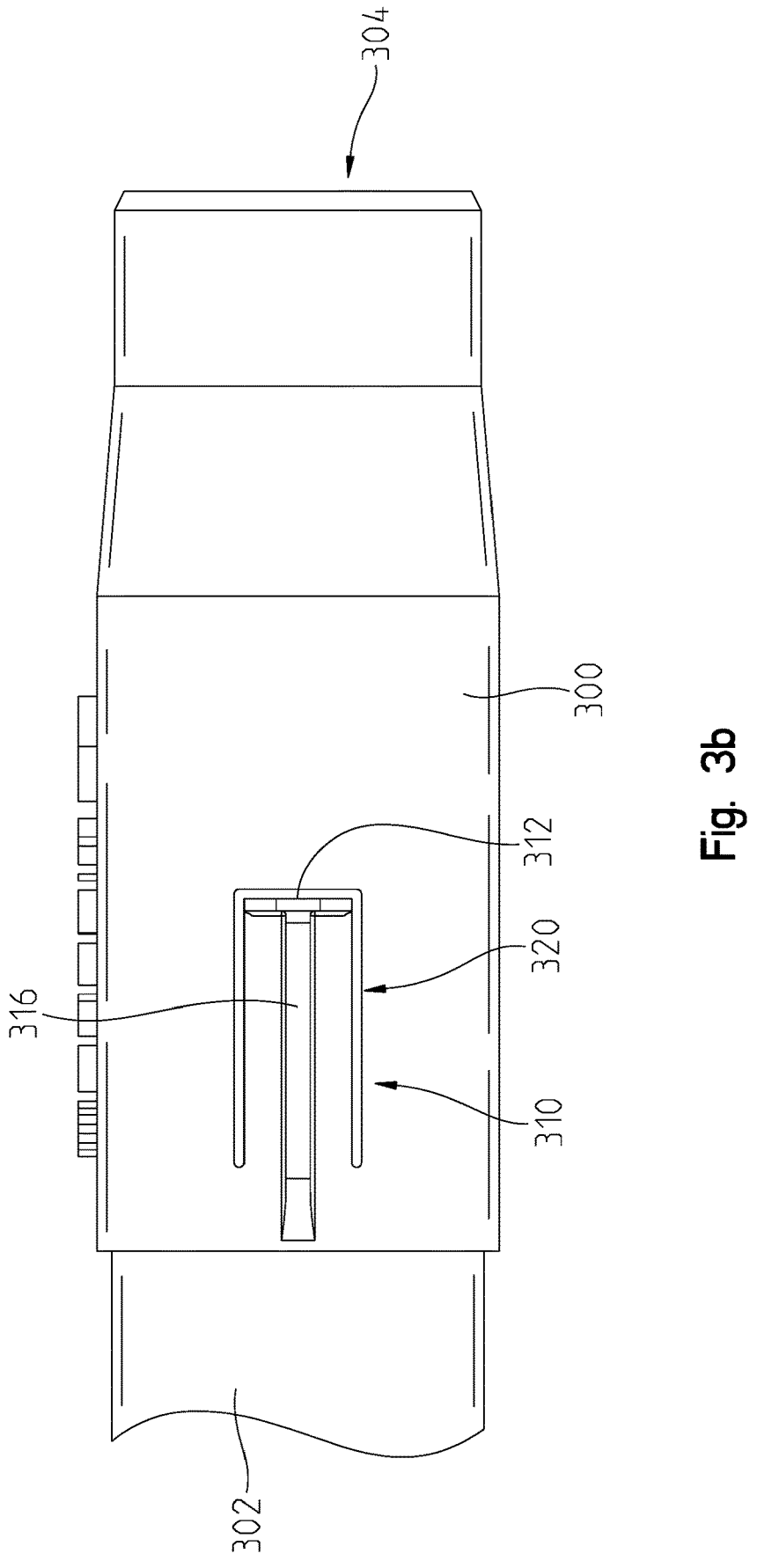
Figure 4A:
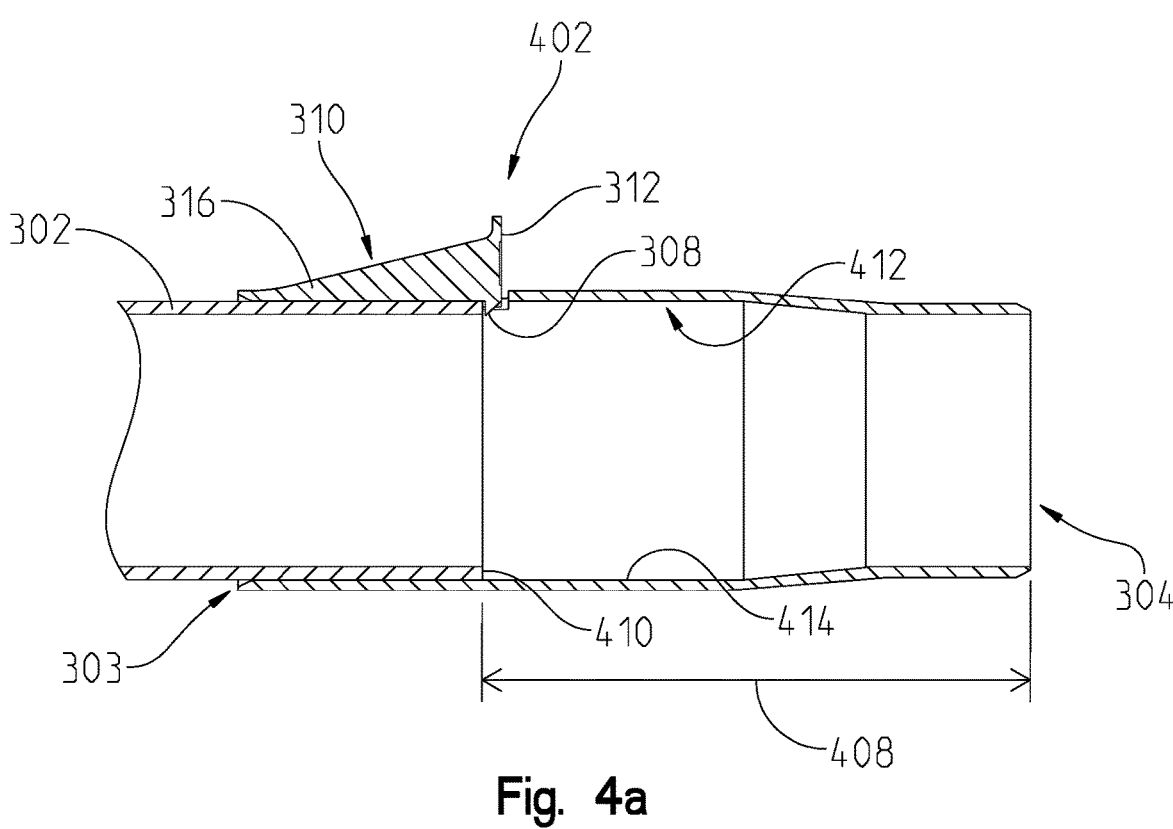
FIG. 4a is a section side view of the sliding connector of FIG. 3a coupled to a tube in an extended displacement.
Figure 4B:
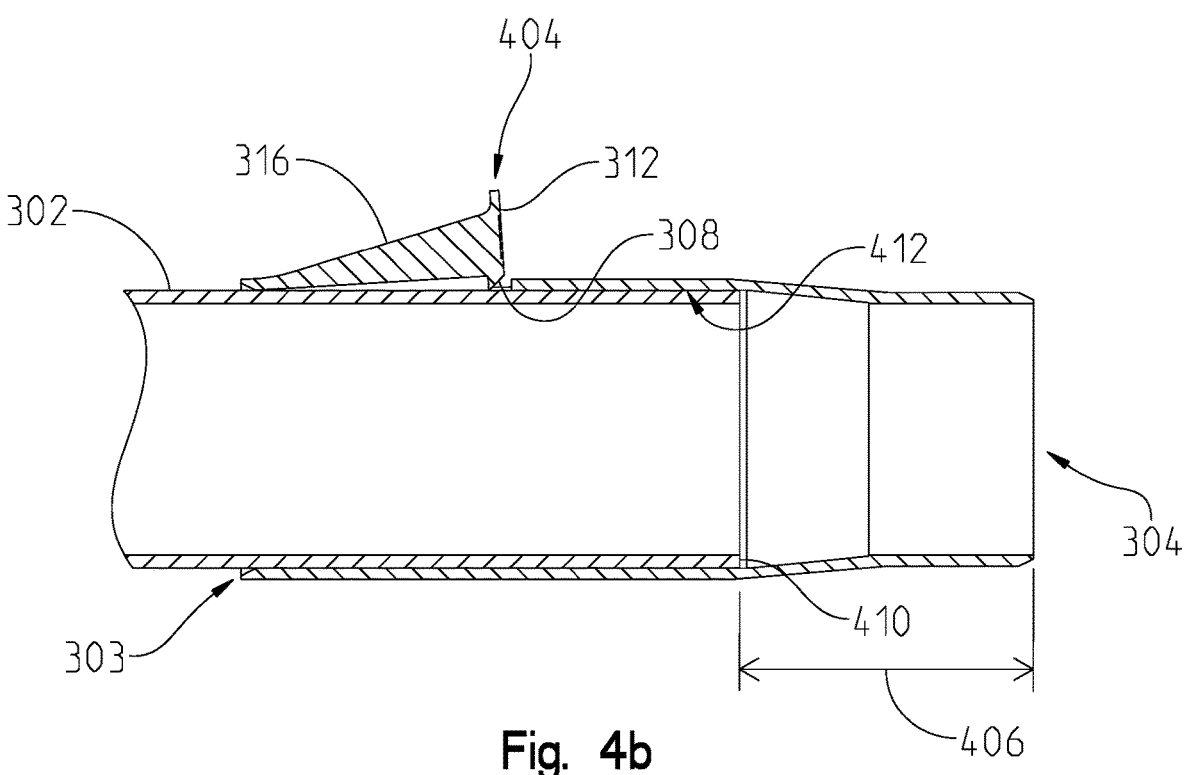
FIG. 4b is a section side view of the sliding connector of FIG. 3a coupled to a tube in an retracted displacement.
Figure 5A:
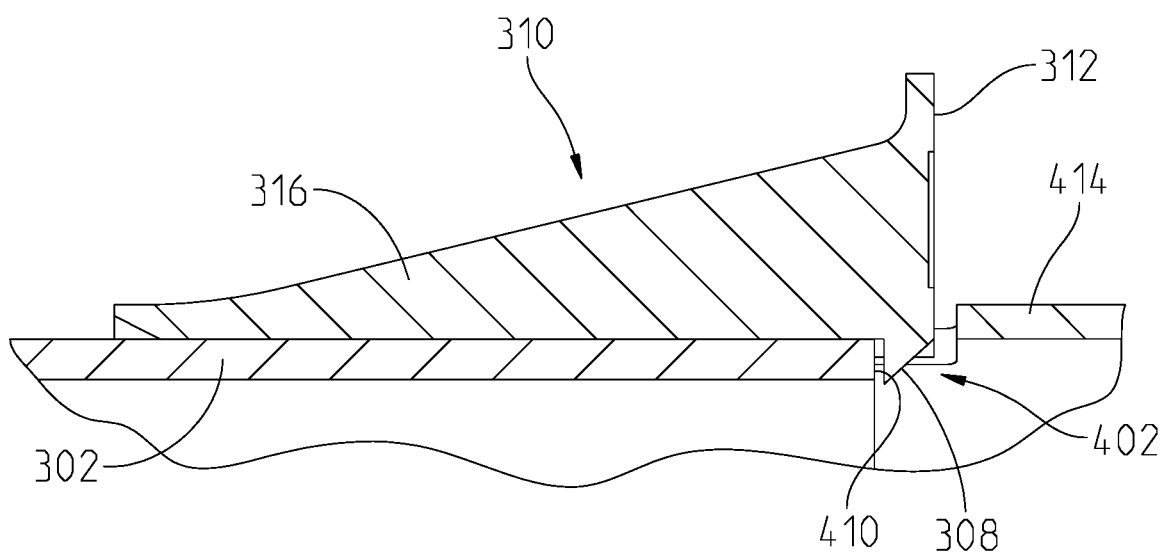
FIG. 5a is a detailed section view of a locking assembly of the sliding connector of FIG. 3a in a latched orientation.
Figure 5B:
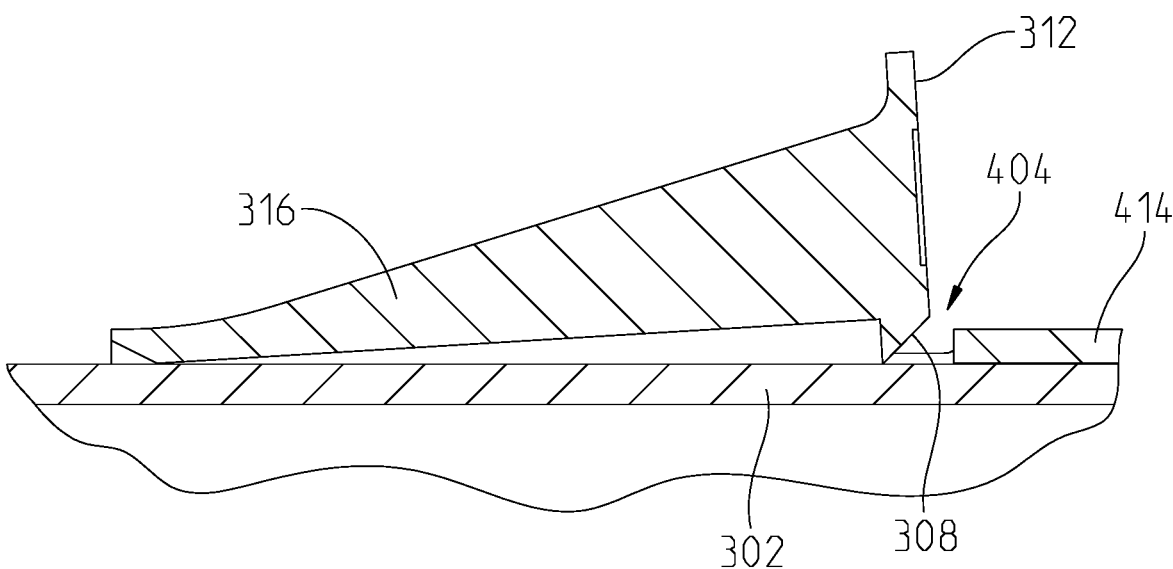
FIG. 5b is a detailed section view of the locking assembly of the sliding connector of FIG. 3a in a released orientation.

Referring now to FIG. 3, one embodiment of a sliding connector 300 is illustrated. The sliding connector 300 may be sized to slide over a pipe 302 on a pipe receiving end 303 and have a coupling end 304 on the opposite end. The coupling end 304 may be sized to be selectively fluidly coupled to the tank 24, metering system 27, manifold 52 or any other part of the pneumatic distribution system 32. Regardless, the sliding connector 300 is sized to slide along the pipe 302 a sliding distance 306 between a latched orientation 402 wherein the sliding connector 300 is extended relative to a distal end 410 of the pipe 302 and a released orientation 404 wherein the sliding connector 300 can be transitioned to a collapsed configuration wherein the sliding connector 300 extends a retracted displacement 406 from the distal end 410 of the pipe 302. In one aspect of this disclosure, the sliding connector 300 may have indicia 322 thereon the provides an indication of the proper orientation of the sliding connector 300 with reference to the air flow direction of the pneumatic distribution system 32.

In the released orientation 404, the sliding connector 300 can be oriented the retracted displacement 406 from a distal end 410 of the corresponding pipe 302. Alternatively, in the latched orientation 402, a latch 308 may engage the distal end 410 of the pipe 302 to selectively prevent the sliding connector 300 from sliding towards the distal end 410, thereby establishing an extended displacement 408 of the sliding connector 300 relative to the distal end 410 of the pipe 302. The extended displacement 408 may be sufficiently greater than the retracted displacement 406 so that the coupling end 304 of the sliding connector 300 can be selectively coupled to a receiver (such as the tank 24, metering system 27, or manifold 52) as the sliding connector transitions from the released orientation 404 to the latched orientation 402.

The sliding connector 300 may have a locking mechanism 310 that utilizes the latch 308 to selectively maintain the sliding connector 300 in the latched orientation 402. More specifically, the latch 308 may be naturally biased at least partially radially inward of an inner connector wall 412 of a body 414 of the sliding connector 300. With this configuration, when the sliding connector 300 is moved to the extended displacement 408 from the distal end 410, the locking mechanism 310 may engage the distal end 310 as the latch 308 naturally biases radially inward to the latched orientation 402 as the latch 308 is no longer positioned along the radially outer surface of the pipe 302. Once the latch 308 is orientated in the latched orientation 402, the latch 308 may contact the distal end 410 of the pipe 302 when a force is applied to the sliding connector 300 towards the pipe 302. The contact between the latch 308 and the distal end 410 of the pipe 302 may be sufficient to substantially maintain the sliding connector 300 in the extended displacement 408 even when forces act on the sliding connector 300 towards the pipe 302.

The locking mechanism 310 may be elastically deformable to selectively transition the latch 308 to the released orientation 404 wherein the latch 308 does not substantially contact the distal end 410 of the pipe 302. More specifically, the locking mechanism 310 may have a pushing surface 312 wherein a user may apply a push force PF to the locking mechanism 310 to transition the latch 308 from the latched orientation 402 to the released orientation 404. The push force PF may be such that an average adult can apply the push force PF with only a finger or thumb. In other words, the push force PF can be applied by a user without the use of additional tools. More specifically, the user may use a finger or similar object to press the pushing surface 412 to draw the latch 308 radially away from the tube 302. Once the latch 308 is sufficiently spaced from the distal end 410 of the tube 302, the sliding connector 300 can transition from the latched orientation 402 to the released orientation 404.

In one aspect of this disclosure, the latch 308 may have an angled profile. In this configuration, the latch 308 may easily slide along the sliding distance 306 towards the extended displacement 408. However, the latch 308 may inhibit movement towards the retracted displacement 406 unless the pushing surface 312 is engaged to bias the latch 308 away from the radially external surface of the pipe 302.

In another aspect of this disclosure, the locking mechanism 310 may be formed from a cutout 314 through a portion of the sliding connector 300. In one aspect of this disclosure, the cutout 314 may be substantially U-shaped. However, other shapes are considered herein. This configuration may allow the latch 308 to be selectively deflected away from the pipe 302 while staying connected to the sliding connector 300. Further still, this configuration allows the locking mechanism 310 to be formed from the same material as the remaining components of the sliding connector 300.

The locking mechanism 310 may also have a stiffening support 316. The stiffening support 316 may run from the pushing surface 412 towards the pipe receiving end 303 at least partially between portions of the cutout 314. The stiffening support 316 may provide a reinforcement to the latch 308 to alter the pushing force PF required on the pushing surface 312 to transition the latch 308 to the released orientation. In one example, the width of the stiffening support 316 may be selected to provide the desired stiffening effect on the latch 308. More specifically, a wider stiffening support 316 may require a greater pushing force PF on the pushing surface 312 to transition the latch 308 to the released orientation compared to a relatively thinner stiffening support 316.

In one aspect of this disclosure, the cutout 314 may have a gap that can be filled or otherwise covered with a deflectable seal 320. More specifically, the gap in the sliding connector 300 created by the cutout 314 may be filled with the deflectable seal 320 which may be a material that prevents fluid from transition from a radially inner portion of the sliding connector 300 to a radially outer portion of the inner connector 300 through the gap. This may prevent any commodity or air flow from exiting the pneumatic system 27 through the cutout 314. Further, the deflectable seal 320 may be in or over the cutout 314 and may be malleable such that the locking mechanism 310 can still transition the latch 308 between the latched orientation 402 to the released orientation 404 without tearing or otherwise compromising the material in or over the cutout 314. In this configuration, the material in or over the gap 320 of the cutout 314 allows the locking mechanism 310 to function as described herein while maintaining a fluid seal along the cutout 314.

Figure 6A:
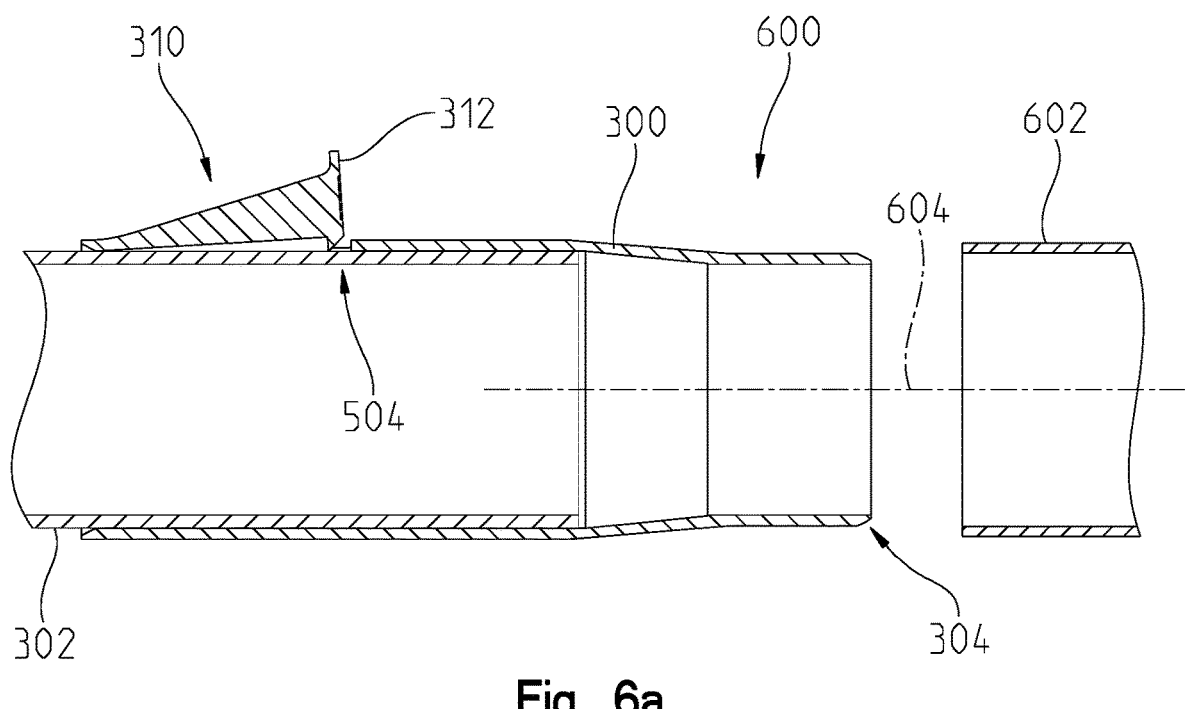
FIG. 6a is a section side view of the sliding connector of FIG. 3a coupled to the tube in the retracted displacement and spaced from a receiver.
Figure 6B:
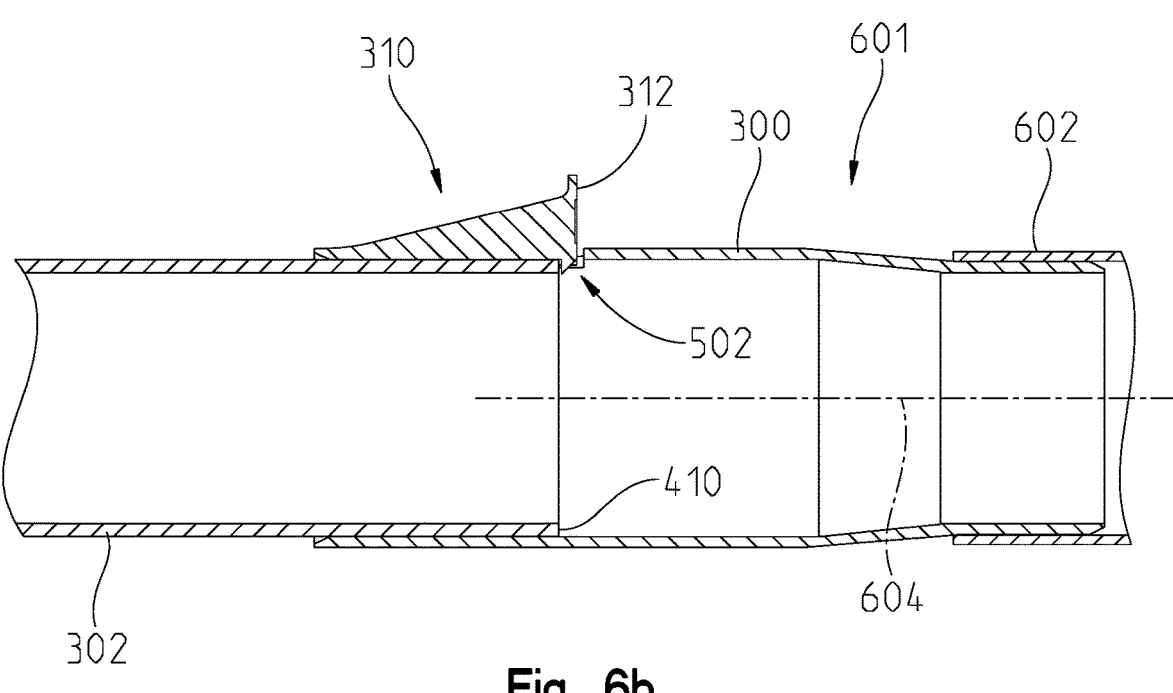
FIG. 6b is a section side view of the sliding connector of FIG. 3a coupled to the tube in the extended displacement and coupled to the receiver.
Figure 7A:
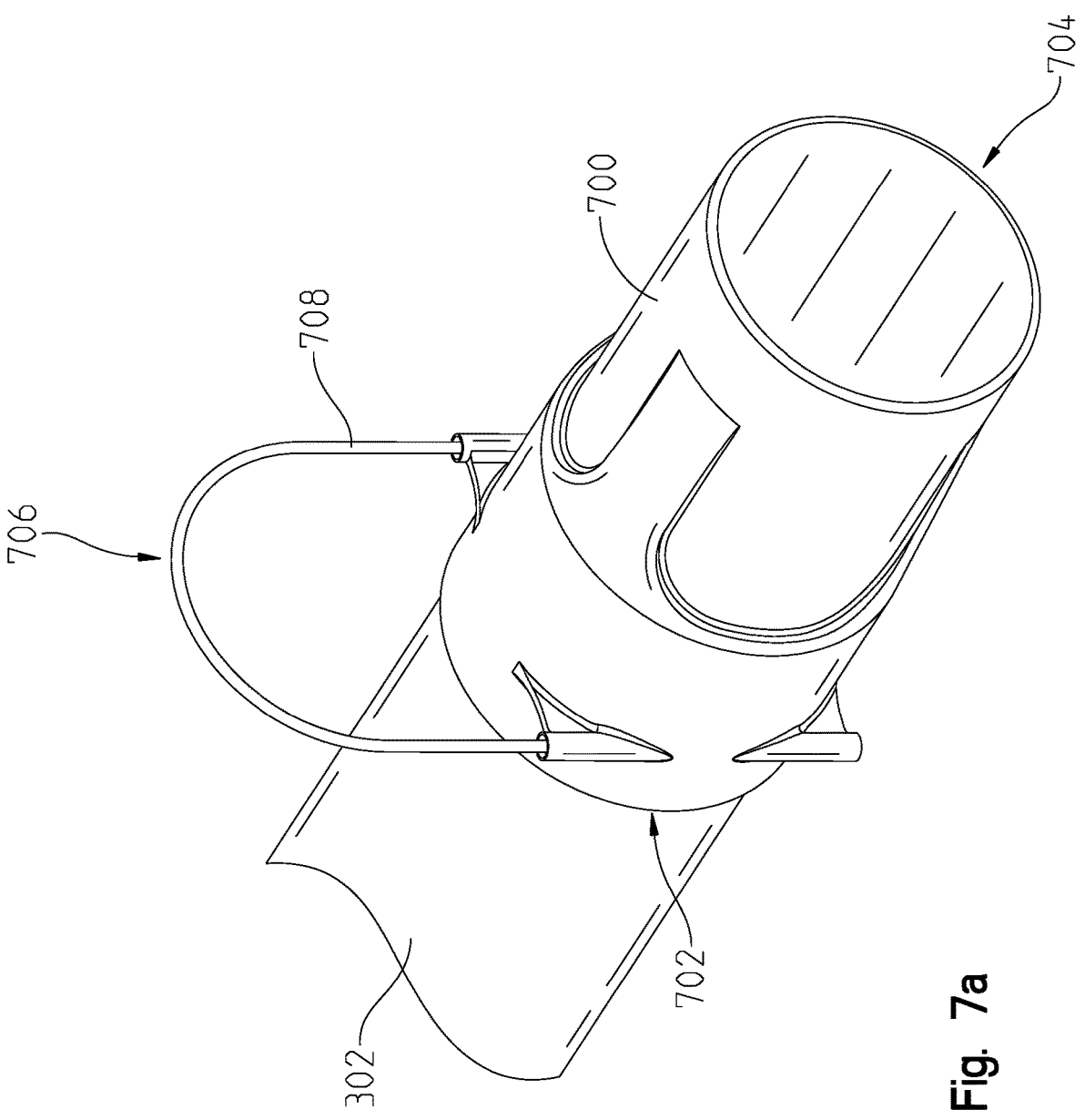
FIG. 7a is an elevated top perspective view of another embodiment of a sliding connector.
Figure 7B:
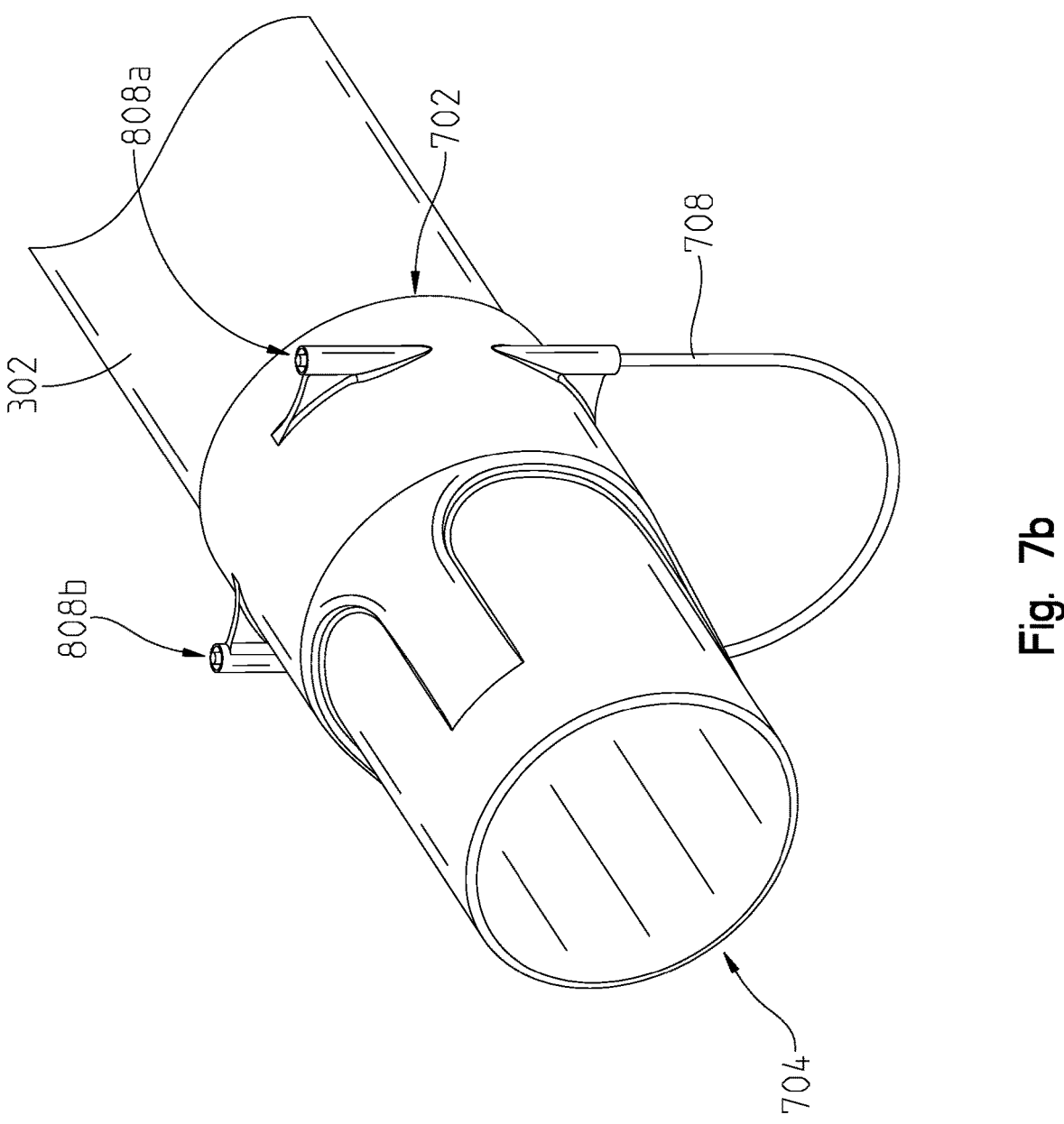
Figure 8A:
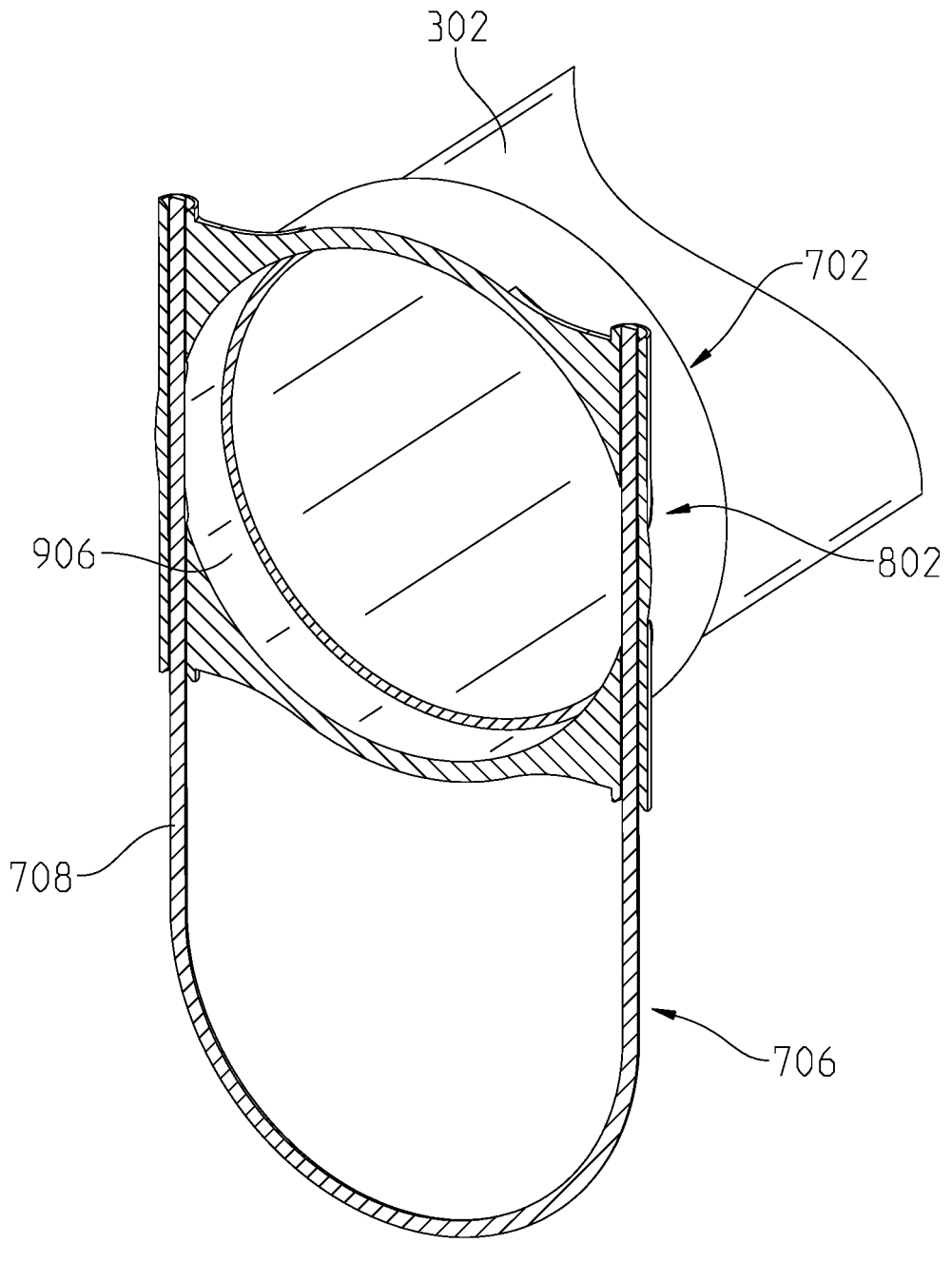
FIG. 8a is a section perspective view of the sliding connector of FIG. 7a with a wicket in a locked orientation.
Figure 8B:
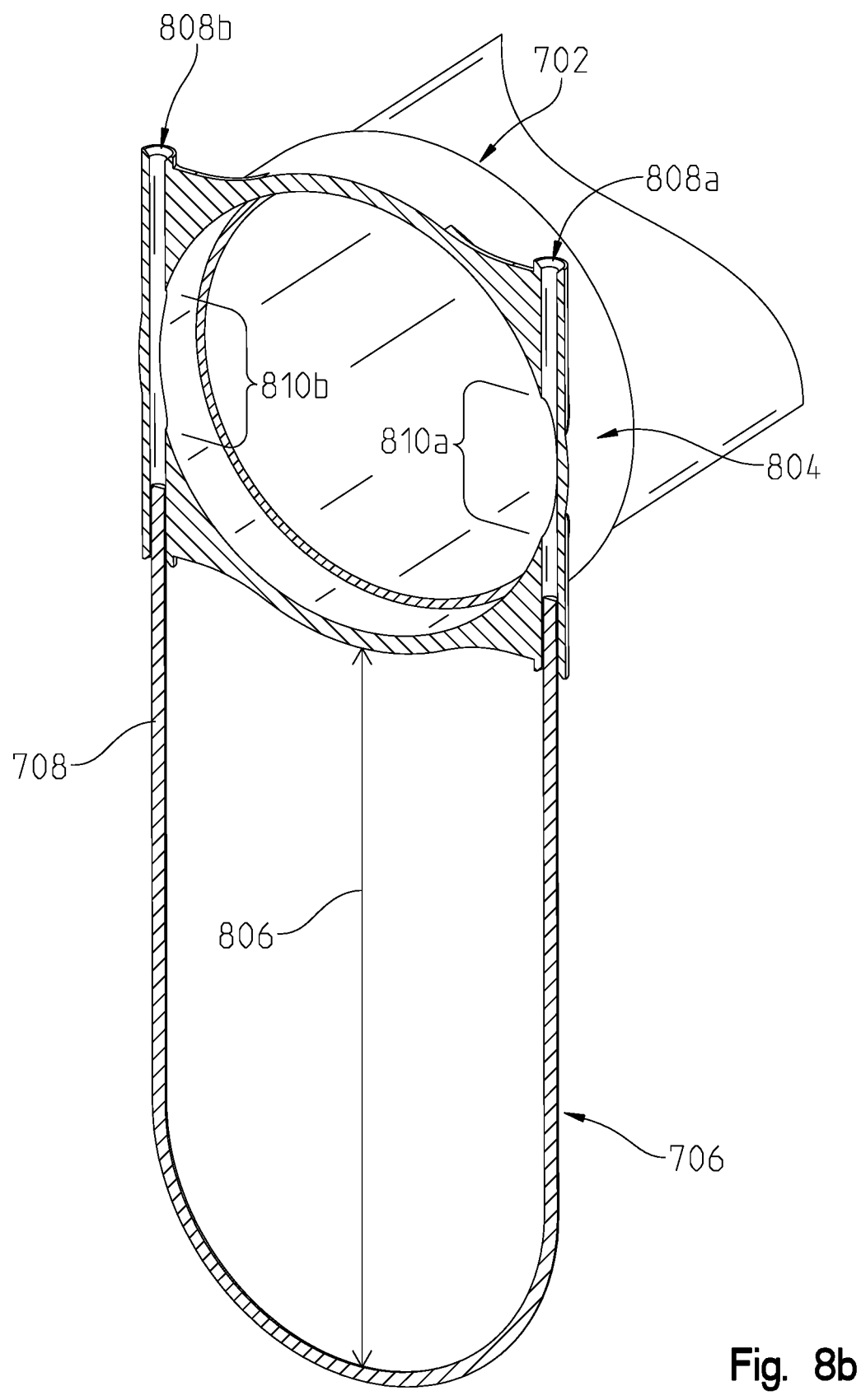
FIG. 8b is a section perspective view of the sliding connector of FIG. 7a with a wicket in a released orientation.

In use and with reference to FIGS. 6a and 6b, the sliding connector 300 may be in the retracted displacement 406 and the coupling end 304 aligned with a receiver 602 in configuration 600. In this configuration 600, the locking assembly 310 is in the released orientation 404 and the sliding connector 300 can slide relative to the pipe 302 axially along axis 604. More specifically, the sliding connector 300 may be slid axially relative to the pipe 302 to the extended displacement 408 as illustrated in an extended configuration 601 of FIG. 6b. In the extended configuration 601, the coupling end 304 is fluidly coupled to the receiver 602 as the latch 308 engages the distal end 410 of the pipe 302 to selectively hold the sliding connector 300 in the extended configuration 601. The latch 308 engages any portion of the distal end 410 of the pipe 302 such that the sliding connector 300 can be any angular orientation about the axis 604 and still be locked in the extended configuration by the latch 308. That is to say, the sliding connector 300 can be rotated about the axis 604 and the latch 308 will still properly engage the distal end 410 of the pipe 302. In one aspect this feature may allow the user to position the locking mechanism 310 at an easily accessible location because the sliding connector 300 can be rotated relative to the tube 302 without affect the functionality discussed herein.

In the extended configuration 601, fluid within the tube 302 is directed through the sliding connector 300 and to the receiver 602 without substantially escaping through the sliding connector 300. In the embodiment of FIGS. 6a and 6b, the coupling end 304 is sized to fit radially within the receiver 602. However, other embodiments contemplated herein have a coupling end 304 sized to fit radially around the receiver 602. Further still, the receiver 602 may be a bracket coupled to a meter assembly, a manifold, or any other part of the pneumatic system 27.

To remove the sliding connector 300 from the receiver 602, a user may press on the pushing surface 312 of the locking mechanism 310 to transition the latch 308 to the released orientation 404. Then, the sliding connector 300 can be slide away from the receiver 602 until the sliding connector is in the retracted displacement 406 wherein the coupling end 304 is at least partially spaced from the receiver 602. In the retracted displacement 406, the sliding connector 300 and pipe 302 may be removed from the pneumatic system 27 and serviced as needed. As mentioned herein, the entire process of coupling, or removing, sliding connector 300 to the receiver 602 can be done by applying the push force PF to the pushing surface 312, which can be done by a user without the use of additional tools.

Referring now to FIGS. 7a-10b another embodiment of a sliding connector 700 is illustrated. The sliding connector 700 may provide similar advantages as the sliding connector 300 in that the sliding connector 700 has a pipe receiving end 702 sized to slidably fit over a pipe 302 such as a conveyance tube or the like. The sliding connector 700 is selectably transitionable between a locked orientation 802 and a released orientation 804. Also similar to the sliding connector 300, the sliding connector 700 can be positioned by a user in either the locked orientation or the released orientation without the use of tools.

In the released orientation 804, a locking mechanism 706 may have a wicket 708 with two ends positioned in parallel through holes 808a, 808b, the wicket 708 being in a spaced configuration 806 from the sliding connector 700. In the spaced configuration 806, the wicket 708 may be partially positioned within the through holes 808a, 808b such that the wicket 708 is not be occupying tangential pathways 810a, 810b of the sliding connector 700 defined in part by the through holes 808a, 808b. The tangential pathways 810a, 810b are positioned along a radially inner wall 906 of the sliding connector 700. In the spaced configuration 806, the wicket 708 does not occupy the tangential pathways 810a, 810b and the pipe 302 may slide passed the through holes 808a, 808b uninhibited by the wicket 708 so the sliding connector 700 slide to a retracted displacement 902 wherein the coupling end 704 is spaced a minimal distance from the distal end 410 of the pipe 302.

However, the sliding connector 700 may be slidable along the pipe 302 to be positioned in an extended displacement 904 wherein the sliding connector 700 is extended farther from the distal end of the tube 302 compared to the retracted displacement 902. The sliding connector 700 may slide sufficiently far along the tube 302 such that no portion of the tube 302 is positioned to block the wicket 708 from being positioned through the tangential pathways 810a, 810b of the holes 808a, 808b and into the locked orientation 802. In other words, once the sliding connector 700 is extended sufficiently far from the distal end 410 of the tube 302 the wicket 708 may be fully positioned through the through holes 808a, 808b and the wicket 708 may be pressed into the locked orientation 802. In the locked orientation 802, the wicket 708 passes through the tangential pathways 810a, 810b of the through holes 808a, 808b along the radially inner portion of the sliding connector 700.

In the locked orientation 802, the wicket 708 is positioned within the through holes 808a, 808b such that the wicket 708 extends at least partially radially inward from the radially inner wall 906 of the sliding connector 700. In this configuration, the sliding connector 700 cannot slide along the tube 302 to the retracted displacement 902 because the wicket 708 will contact the distal end 410 of the tube 302, preventing the sliding connector 700 from sliding further to the retracted displacement 902. However, once the wicket 708 is transitioned to the spaced configuration 806, the wicket 708 no longer occupies the portion of the tangential pathways 810a, 810b of the through holes 808a, 808b that cause the wicket 708 to interfere with and contact the distal end 410 of the tube 302.

In one aspect of this disclosure, the wicket 708 may be transitioned by a user between the locked orientation 802 and the released orientation 804 by pulling or pushing the wicket 708 radially towards or away from the sliding connector 700. In other words, the wicket 708 may be slidable by a user without the use of additional tools as long as the sliding connector 700 is in the extended displacement 904.

Figure 9A:
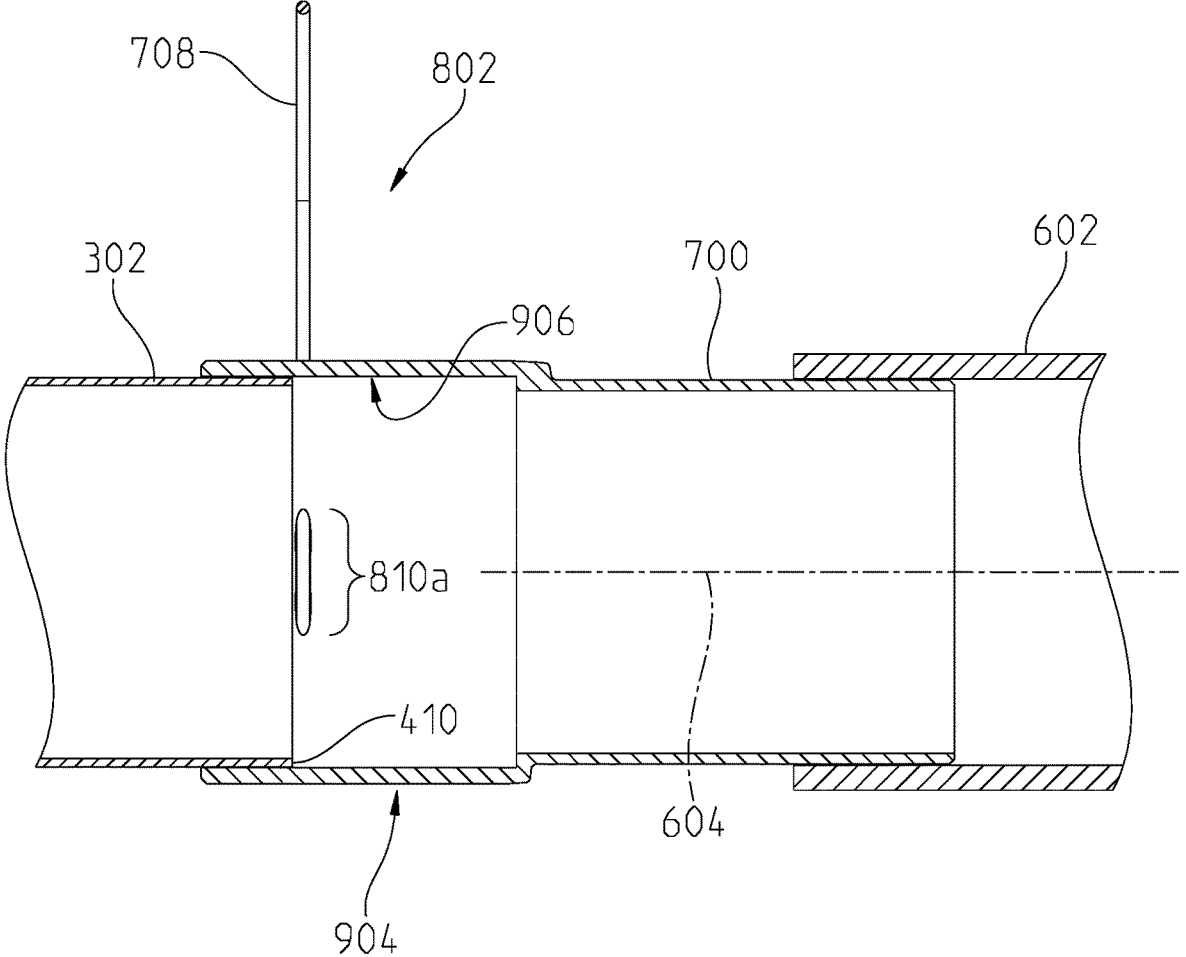
FIG. 9a is a section side view of the sliding connector of FIG. 7a in an extended displacement and coupled to a receiver.
Figure 9B:
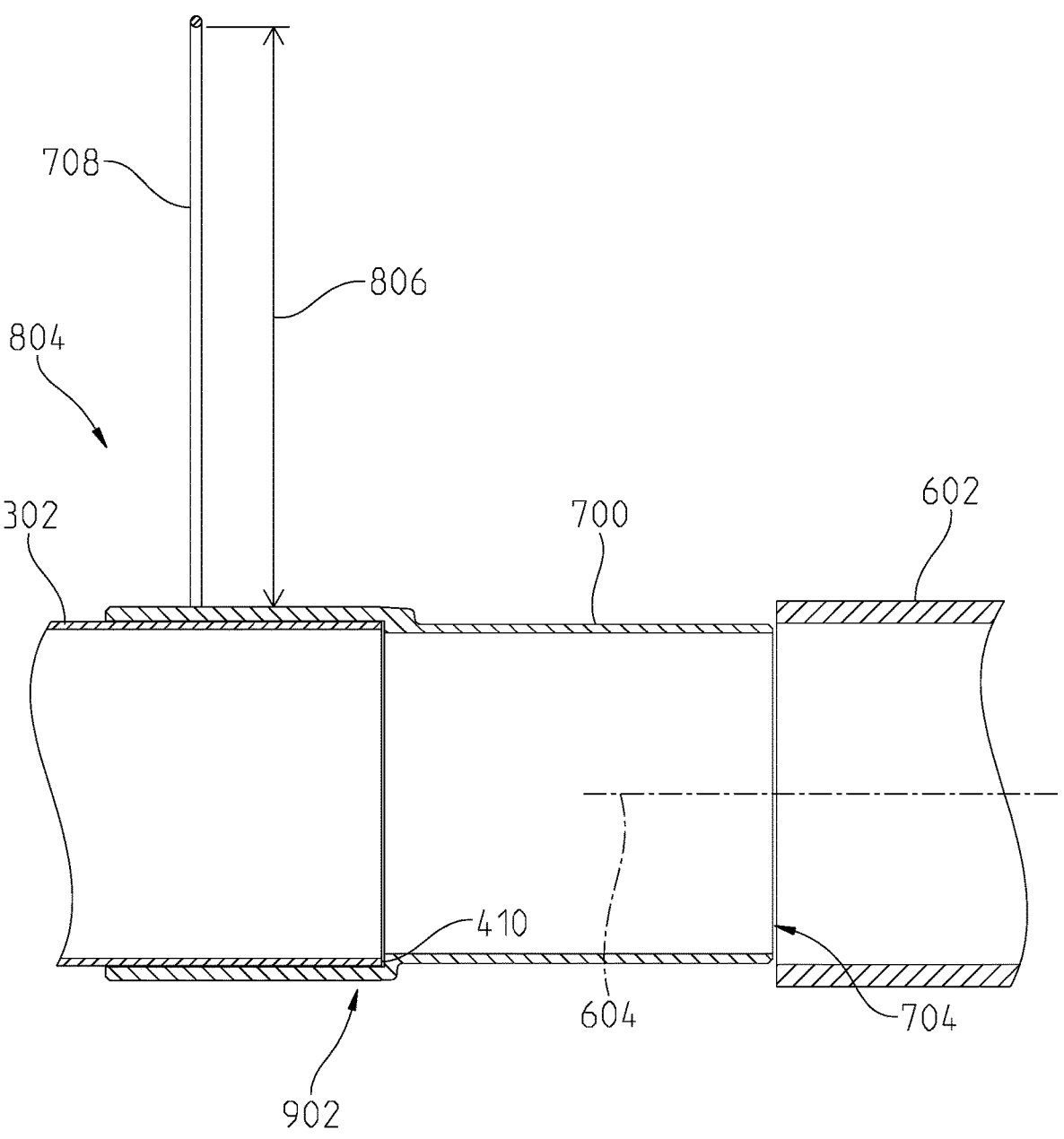
FIG. 9b is a section side view of the sliding connector of FIG. 7a in a retracted displacement and spaced from the receiver.
Figures 10A, 10B:
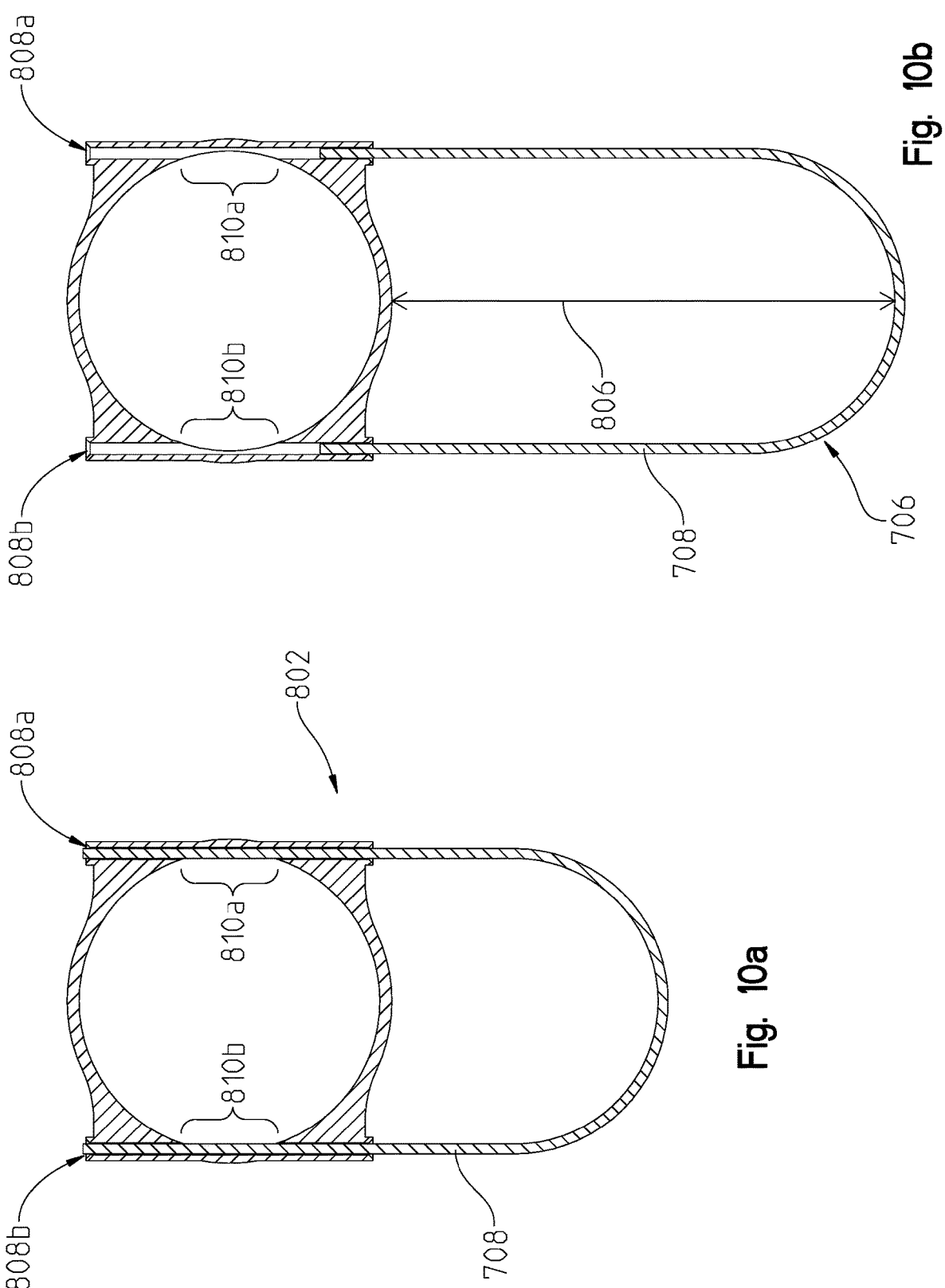
FIG. 10a is a section front view of the sliding connector of FIG. 7a with a wicket in a locked orientation.
FIG. 10b is a section front view of the sliding connector of FIG. 7a with a wicket in a released orientation.

In use, the sliding connector 700 may be in the extended displacement 904 as illustrated in FIG. 9*a*. The wicket 708 may be in the locked orientation 802 such that portions of the wicket 708 extend radially inward from the inner wall 906 of the sliding connector 700 along the tangential pathways 810*a*, 810*b* to contact the distal end 410 of the tube 302 if the sliding connector 700 is forced towards the retracted displacement 902. Accordingly, in the locked orientation 802, the wicket 708 substantially prevents the sliding connector 700 from sliding towards the retracted displacement 902 and thereby maintains fluid coupling to the receiver 602.

If a user wants to remove the sliding connector 700 and tube 302 from the receiver 602, the user may transition the wicket 708 to the spaced configuration 806 wherein the wicket 708 no longer occupies the tangential pathways 810*a*, 810*b* of the through holes 808*a*, 808*b*. With the wicket 708 in the spaced configuration 806, the sliding connector 700 may slide towards the retracted displacement 902 because the distal end 410 of the tube 302 does not contact the wicket 708 at the tangential pathways 810*a*, 810*b* of the through holes 808*a*, 808*b*. Accordingly, the user can remove the sliding connector 700 and corresponding tube 302 from the receiver 602 by transitioning the wicket 708 to the spaced configuration 806 and sliding the sliding connector to the retracted displacement 902. In the retracted position, the coupling end 704 may be free of the receiver 602 such that the sliding coupler 700 and corresponding tube 302 may be removed therefrom.

Similar to the sliding connector 300, the sliding connector 700 may be effectively locked in the extended displacement 904 with the locking mechanism 706 regardless of the rotation of the sliding connector 700 about the axis 604. More specifically, when the wicket 708 is in the locked orientation 802 the wicket 708 will contact the distal end 410 of the tube 302 regardless of the rotation of the sliding connector 700 about the axis 904 relative to the tube 302. In this configuration, the user can rotate the sliding connector 700 so the wicket 708 is easily accessible to the user to selectively transition the wicket to the released orientation 804 as needed.

Figure 11A:
Figure 11B:
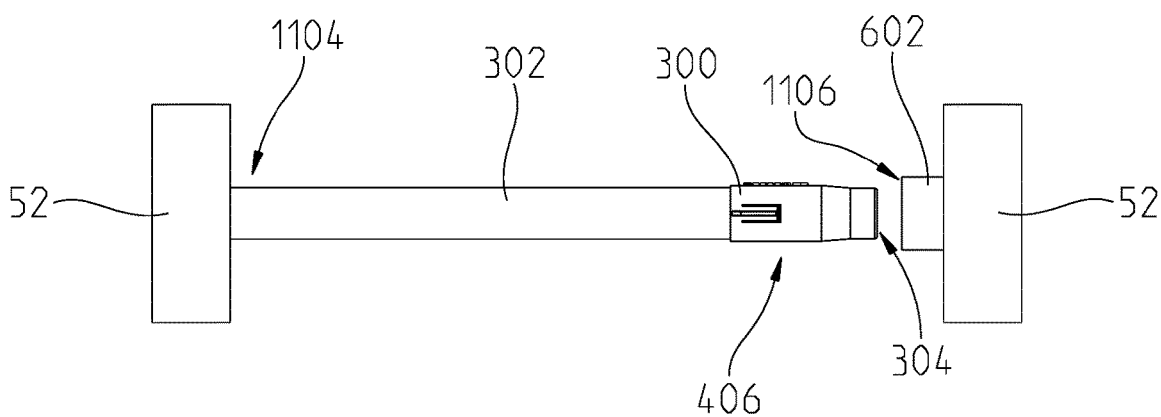
FIG. 11b is a schematic view of the two manifolds of FIG. 11a with a tube and sliding connector in a retracted displacement.
Figure 11C:
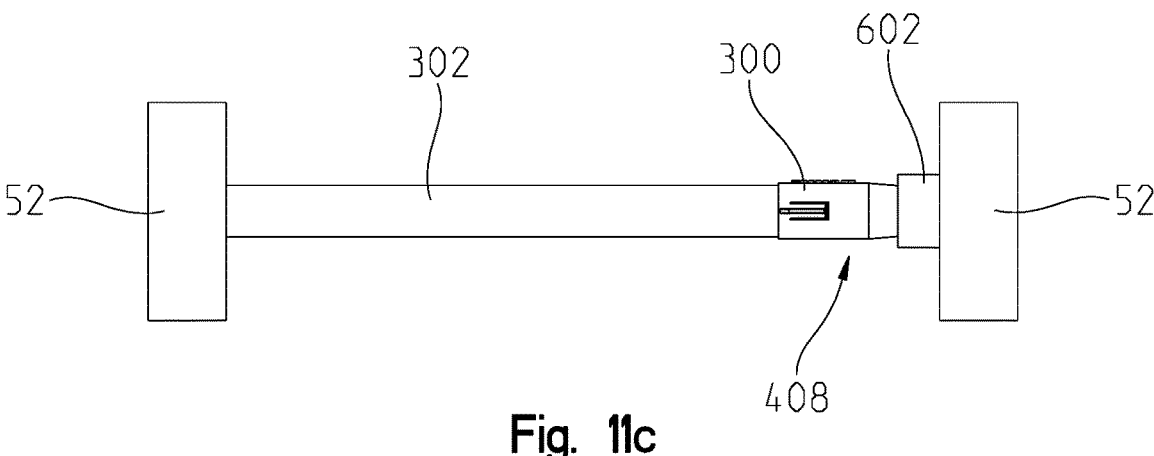
FIG. 11c is a schematic view of the two manifolds of FIG. 11b with the tube and sliding connector in an extended displacement.

Referring now to FIGS. 11*a*-11*c*, one embodiment of an installation sequence utilizing a sliding connector 300, 700 is illustrated. More specifically, FIG. 11*a* illustrates a first and second manifold 52*a*, 52*b* spaced from one another with the conveyance tube removed. The first manifold 52*a* may have an upstream receiver 1102 and the second manifold 52*b* may have the receiver 602 discussed herein. The upstream receiver 1102 may be sized to fit radially within the tube 302. Alternatively, the upstream receiver 1102 may have a coupler sized to fit radially around the outer surface of the tube 302. Regardless, in FIG. 11*b* the connector 300 may be in the retracted displacement 406 wherein an open end 1104 of the tube 302 may be coupled to the upstream receiver 1102. More specifically, the retracted displacement 406 of the sliding connector 300 provides sufficient clearance between the upstream receiver 1102 and receiver 602 so the tube 302 and sliding connector 300 fit there between to couple the open end 1104 of the tube 302 to the upstream receiver 1102. As mentioned herein, the open end 1104 may be coupled around, or within, the upstream receiver 1102.

With the open end 1104 coupled to the upstream receiver 1102 and the sliding connector 300 in the retracted displacement 406, there may be gap 1106 between the coupling end 304 of the sliding connector 300 and the receiver 602. The gap 1106 allows the sliding connector 300 and tube 302 to be aligned with the receiver 602. Once aligned with the receiver 602, the sliding connector 300 may slide to the extended displacement 408 as the coupling end 304 slides into the receiver 602 until the locking mechanism 310 transitions to the latched orientation 402. Once the sliding connector 300 is in the extended displacement 408 and locking mechanism 310 is in the latched orientation 402 as illustrated in FIG. 11*c*, the tube 302 and sliding connector 300 are substantially locked between the manifolds 52*a*, 52*b* such that fluid is directed from the upstream receiver 1102, through the tube 302 and sliding connector 300, and into the receiver 602.

The tube 302 and sliding connector 300 can be removed from the manifolds 52*a*, 52*b* by transitioning the locking assembly 310 to the released orientation 404 as discussed herein and sliding the sliding connector 300 to the retracted displacement 406. The gap 1106 allows the tube 302 and sliding connector 300 to be moved away from both the receiver 602 and upstream receiver 1102 to fully remove the tube 302 and sliding connector 300 from the manifolds 52*a*, 52*b*.

While manifolds 52*a*, 52*b* are discussed herein for FIGS. 11*a*-11*c*, any fluid coupling locations on an air cart 12 or other agricultural machine are considered herein and the manifolds 52*a*, 52*b* are one example. Further, while FIGS. 11*a*-11*c* depict the sliding connector 300, it is also contemplated herein to use sliding connector 700 instead of sliding connector 300. The sliding connector 700 can transition between the retracted displacement 902 and the extended displacement 904 as discussed herein and can therefore be implemented in substantially the same way as the sliding connector 300.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A sliding connector pipe assembly for a pipe defining an axis and configured to direct fluid flow, comprising:

a sliding connector slidably positioned around an end portion of the pipe, the sliding connector being selectively slidable between an extended displacement and a retracted displacement relative to the pipe; and a locking mechanism that selectively prevents axial movement of the sliding connector from the extended displacement to the retracted displacement in a locked orientation, the locking mechanism being elastically deformable to a released orientation;

wherein the locking mechanism prevents the sliding connector from transitioning from the extended displacement to the retracted displacement regardless of the rotational orientation of the sliding connector relative to the pipe about the axis when the locking mechanism is in the locked orientation;

wherein when the locking mechanism is elastically deformed to the released orientation, the sliding connector is movable from the extended displacement to the retracted displacement;

wherein the locking mechanism comprises a latch that extends at least partially radially inwardly past an inner connector wall in a latched orientation;

wherein the latch is naturally biased at least partially radially inwardly past the inner connector wall.

2. The assembly of claim 1, wherein the locking mechanism is selectively releasable from the locked orientation without the use of additional tools.

3. The assembly of claim 1, wherein the sliding connector has a coupling end sized to fit within a receiver to fluidly couple the pipe to the receiver when the sliding connector is in the extended displacement.

4. The assembly of claim 3, wherein the sliding connector has a sliding distance between the retracted displacement and the extended displacement, wherein the sliding distance is sufficient to allow the coupling end to at least partially overlap the receiver when in the extended displacement and the locking mechanism selectively locks the sliding connector in the extended displacement partially overlapping the receiver.

5. The assembly of claim 1, wherein the latch is deflectable to the released orientation wherein the latch does not substantially extend radially inwardly past the inner connector wall.

6. The assembly of claim 1, wherein the locking mechanism is formed of the same material as a body of the sliding connector.

7. The assembly of claim 1, wherein the latch is formed, in part, of a cutout of the sliding connector.

8. The assembly of claim 7, wherein the cutout has a deflectable seal therein to prevent fluid from passing through the cutout.

9. The assembly of claim 8, further wherein the latch comprises a stiffening support to alter a push force required to deflect the latch to the released orientation.

10. A sliding connector assembly, comprising:

a pipe receiving end defined about an axis and configured to slidably receive a pipe therein;

a coupling end configured to selectively couple the coupling end to a receiver; and a locking mechanism comprising a latch that is naturally biased radially inward from an inner connector wall in a latched configuration and is configured to selectively limit the axial movement of the pipe when positioned in the pipe receiving end in a locked orientation, the locking mechanism being elastically deformable to a released orientation;

wherein the locking mechanism is configured to selectively lock the axial location of the pipe regardless of the rotation orientation of the pipe about the axis relative to the pipe receiving end when the locking mechanism is in the locked orientation;

wherein when the locking mechanism is elastically deformed to the released orientation, the connector assembly is movable from the extended displacement to the retracted displacement; and wherein in the locked orientation the locking mechanism prevents the sliding connector from transitioning from the extended displacement to the retracted displacement regardless of the rotational orientation of the sliding connector.

11. The sliding connector of claim 10, wherein the latch is deflectable to the released orientation wherein the latch does not substantially extend radially inwardly past the inner connector wall.

12. A method for coupling a pipe to a receiver, comprising:

releasing a locking mechanism on a sliding connector by elastically deforming the locking mechanism to a released orientation and axially moving the sliding connector to a retracted displacement on the pipe;

positioning a coupling end of the sliding connector adjacent to a receiver;

axially moving the sliding connector along the pipe towards an extended displacement as the coupling end is coupled to the receiver; and locking the sliding connector in the extended displacement with the locking mechanism such that the sliding connector is prevented from returning to the retracted displacement by the locking mechanism through a latch that is naturally biased radially inward from an inner connector wall in a latched configuration;

wherein the locking mechanism selectively locks the sliding connector in the extended displacement regardless of the rotational position of the sliding connector relative to the pipe or receiver about an axis.

13. The method of claim 12, further comprising removing the pipe from the receiver by releasing the locking mechanism by elastically deforming the sliding connector so a latch on the sliding connector does not contact the pipe to allow the sliding connector to transition from the extended displacement to the retracted displacement.

* * * * *